(12) United States Patent
You (10) Patent No.: US 7,953,460 B2
(45) Date of Patent: May 31, 2011

(54) MOBILE TERMINAL HAVING DUAL DISPLAY UNIT AND METHOD OF CONTROLLING DUAL SPEAKER AND DUAL MICROPHONE THEREOF

(75) Inventor: Jeong Min You, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 698 days.

(21) Appl. No.: 11/943,340

(22) Filed: Nov. 20, 2007

(65) Prior Publication Data

US 2008/0161061 A1 Jul. 3, 2008

(30) Foreign Application Priority Data

Dec. 28, 2006 (KR) .................. 10-2006-0135875

(51) Int. Cl.
*H04M 1/00* (2006.01)
*H04R 3/00* (2006.01)
(52) U.S. Cl. ............... 455/575.1; 455/575.2; 455/575.3; 455/575.4; 381/111; 381/112; 381/113; 381/114; 381/115; 381/116
(58) Field of Classification Search ............... 455/575.1, 455/575.2, 575.3, 575.4; 381/111, 112, 113, 381/114, 115, 117, 116
See application file for complete search history.

(56) References Cited

U.S. PATENT DOCUMENTS

| 5,898,774 | A * | 4/1999 | Shindo ................ 379/433.13 |
| 7,251,511 | B2 * | 7/2007 | Park ...................... 455/575.3 |
| 7,394,480 | B2 * | 7/2008 | Song ..................... 455/575.3 |
| 7,711,396 | B2 * | 5/2010 | Kim ...................... 455/575.1 |
| 2005/0130719 | A1 * | 6/2005 | Lee ....................... 455/575.3 |
| 2005/0287953 | A1 * | 12/2005 | Ikeda et al. ............ 455/575.3 |
| 2006/0019714 | A1 * | 1/2006 | Lee et al. .................. 455/566 |

FOREIGN PATENT DOCUMENTS

| KR | 1020030035555 | 5/2003 |
| KR | 1020050035557 | 4/2005 |
| KR | 1020050051086 | 6/2005 |
| KR | 1020060042456 | 5/2006 |

* cited by examiner

*Primary Examiner* — Wen W Huang
(74) *Attorney, Agent, or Firm* — The Farrell Law Firm, P.C.

(57) ABSTRACT

A mobile terminal having a dual display unit, a dual speaker and a dual microphone, and a method of controlling the dual speaker and the dual microphone thereof are provided. The method of controlling a dual speaker and a dual microphone of a mobile terminal having a dual display unit including a first body having a first display unit and first speaker on a front surface and a second display unit and second speaker on a rear surface, a second body having a first and a second microphone, and a hinge module for rotatably connecting the first body and the second body, includes determining which of the first and second display units is activated; activating, if the first display unit is activated, the first speaker; and activating, if the second display unit is activated, the second speaker.

18 Claims, 6 Drawing Sheets

MOBILE TERMINAL HAVING DUAL DISPLAY UNIT AND METHOD OF CONTROLLING DUAL SPEAKER AND DUAL MICROPHONE THEREOF

PRIORITY

This application claims priority under 35 U.S.C. §119 to a Korean Patent application filed in the Korean Intellectual Property Office on Dec. 28, 2006, and assigned Ser. No. 2006-0135875, the contents of which are incorporated herein by reference.

BACKGROUND OF THE INVENTION

1. Field of the Invention

The present invention relates to a mobile terminal and a method of controlling a function thereof, and more particularly, to a mobile terminal having a dual display unit for activating a function of a speaker and a microphone positioned on a surface of an activated display unit, and a method of controlling a dual speaker and a dual microphone thereof.

2. Description of the Related Art

Nowadays, due to the rapid development of communication technology, voice communication can be performed using a mobile terminal at almost any time and place. As various functions are added to the mobile terminal due to the increase of memory capacity, a multimedia function such as a character message transmission and reception function, video player function, MP3 player function, and game player function can be provided to a user. The mobile terminal may be a mobile communication terminal, Personal Digital Assistant (PDA), and Portable Multimedia Player (PMP).

A conventional mobile terminal performs a communication mode and a multimedia mode using one display unit. However, in the conventional mobile terminal, because both a keypad and navigation keys are provided on a surface in which the display unit is provided, the size of the display unit is limited. Accordingly, it is difficult to provide a screen having a satisfactory size to the user in the multimedia mode.

In order to solve such a problem, a mobile terminal having a dual display unit including both a first display unit for displaying a multimedia screen in a multimedia mode on one surface, and a second display unit for displaying communication information in a communication mode on another surface, has been developed. However, a conventional mobile terminal having a dual display unit is used by activating only one of a communication mode and a multimedia mode, and has a microphone and a speaker on a rear surface in which the second display unit for performing a communication mode is provided.

Accordingly, when multimedia data are viewed through the first display unit for performing a multimedia mode, an image is output through the first display unit on a front surface, and a sound is output through the speaker on the rear surface, therefore sound quality is reduced in the multimedia mode.

SUMMARY OF THE INVENTION

The present invention has been made in an effort to solve the above problems, and the present invention provides a mobile terminal having a dual display unit and a method of controlling a dual speaker and a dual microphone thereof for improving sound quality by outputting a sound from a surface in which a display unit is activated.

The present invention further provides a mobile terminal having a dual display unit and a method of controlling a dual speaker and a dual microphone thereof for activating a function of a speaker and a microphone positioned on a surface in which a display unit is activated.

In accordance with an aspect of the present invention, a method of controlling a dual speaker and a dual microphone of a mobile terminal having a dual display unit including a first body having a first display unit and a first speaker on a front surface of the first body and a second display unit and a second speaker on a rear surface of the first body, a second body having a first microphone on a front surface of the second body and, in a normal state, the first microphone facing the same direction as the first display unit and a second microphone on a rear surface of the second body and the second microphone facing the same direction as the second display unit, and a hinge module perpendicularly penetrating a surface of the first body that faces the second body and a surface of the second body that faces the first body to rotatably connect the first body and the second body, the method includes determining which of the first and second display units is activated; activating, if the first display unit is activated, the first speaker; and activating, if the second display unit is activated, the second speaker.

The method may further include determining, if the first display unit is activated, whether the first and second bodies are in a normal state or in a rotation state; activating, if the first and second bodies are in a normal state, the first microphone; and inactivating, if the first and second bodies are in a rotation state, the first microphone and activating the second microphone.

The method may further include determining, if the second display unit is activated, whether the first and second bodies are in a normal state or in a rotation state; activating, if the first and second bodies are in a normal state, the second microphone; and inactivating, if the first and second bodies are in a rotation state, the second microphone and activating the first microphone.

In accordance with another aspect of the present invention, a mobile terminal having a dual display unit includes a first body having a first display unit and a first speaker on a front surface and a second display unit and a second speaker on a rear surface; a second body having a first microphone on a front surface thereof facing the same direction as the first display unit in a normal state and a second microphone on a rear surface thereof facing the same direction as the second display unit in a normal state; a hinge module perpendicularly penetrating a surface of the first body that faces the second body and a surface of the second body that faces the first body to rotatably connect the first body and the second body; and a controller for determining which of the first and second display units is activated, activating, if the first display unit is activated, the first speaker, and activating, if the second display unit is activated, the second speaker.

The mobile terminal may further include a rotation detection unit for determining whether the first and second bodies are in a normal state or in a rotation state.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In The present invention, a "normal state" is a state in which a front surface of a first body and a front surface of a second body of a mobile terminal align, i.e. the front surfaces are arranged on a same plane and facing a same direction, and a "rotation state" is a state in which the front surface of the first body and the front surface of the second body do not align.

Figure 1:
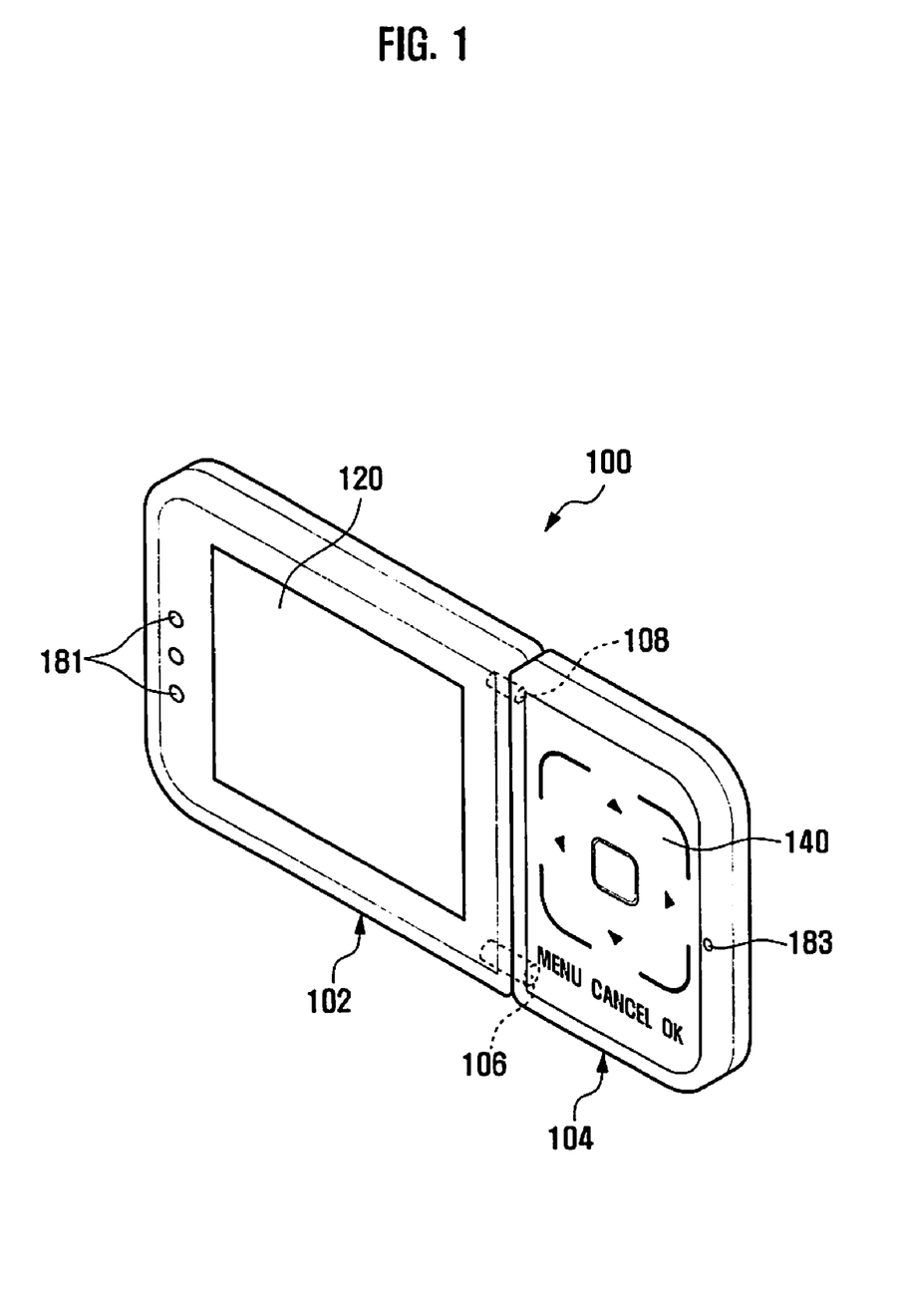
FIG. 1 is a perspective view illustrating a front side of a mobile terminal having a dual display unit according to an exemplary embodiment of the present invention in a normal state.
Figure 2:
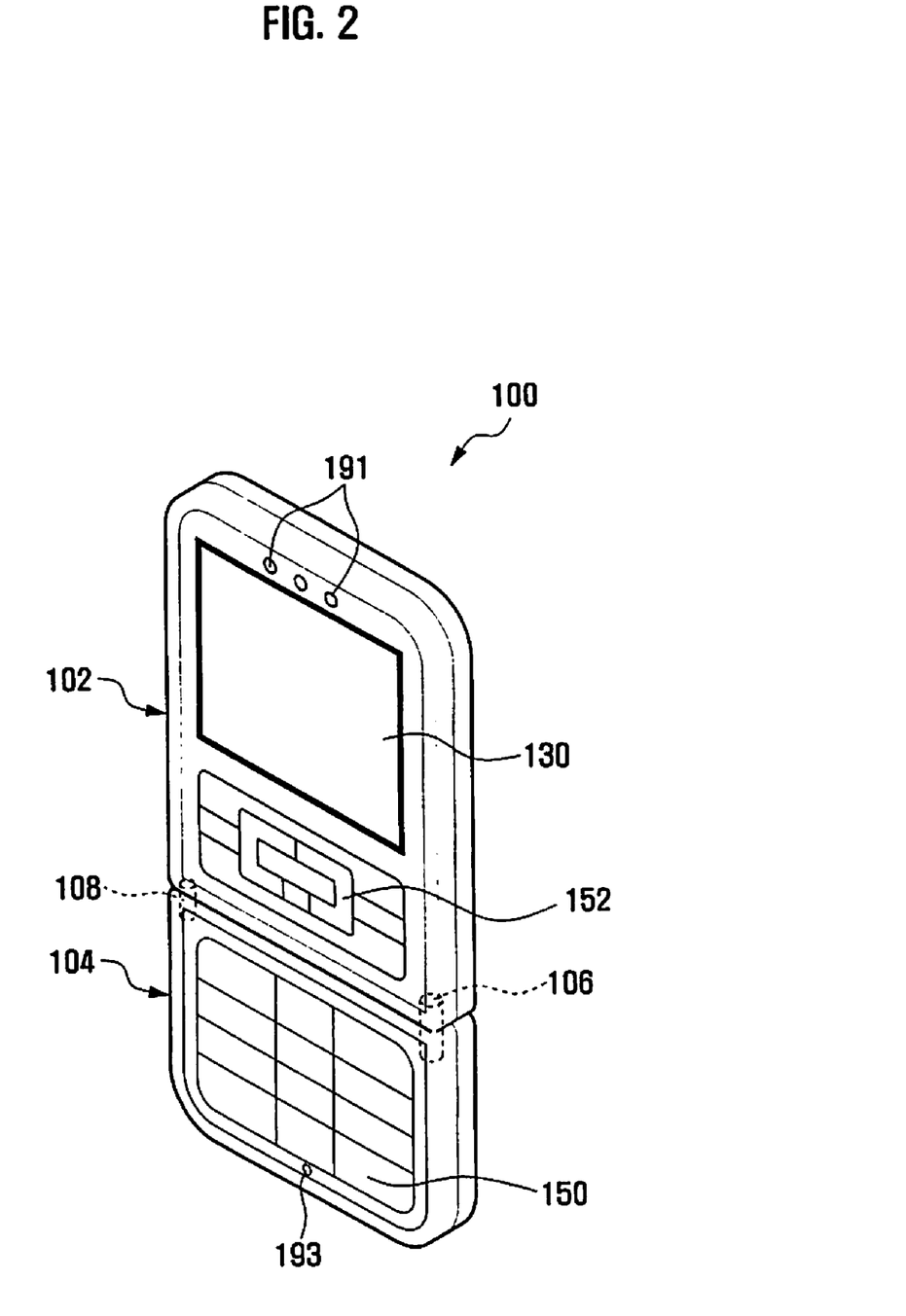
FIG. 2 is a perspective view illustrating a rear side of the mobile terminal shown in FIG. 1.
Figure 3:
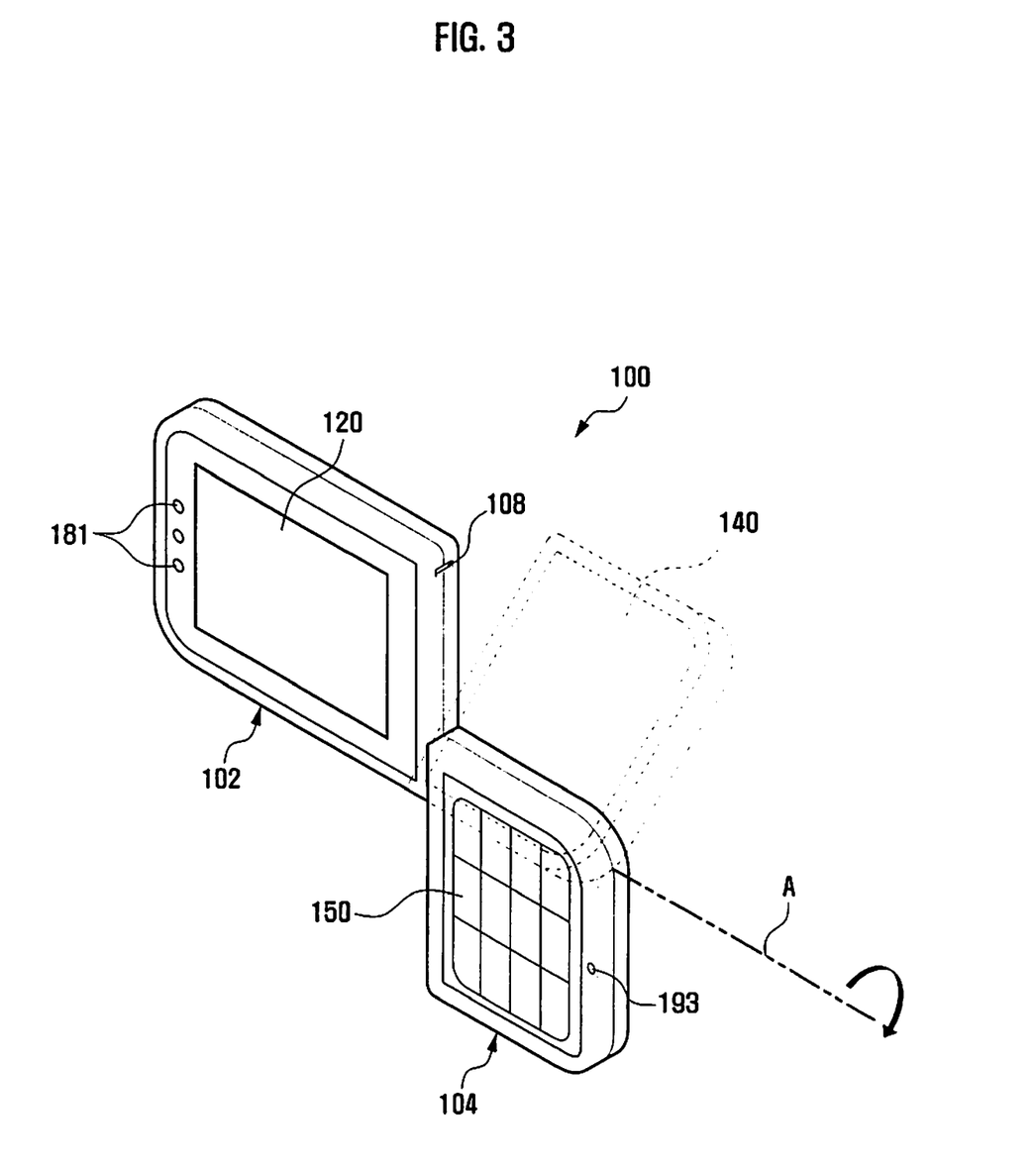
FIG. 3 is a perspective view illustrating a side of the mobile terminal shown in FIG. 1 in a state in which a second body of the mobile terminal is rotated by 180°.

Referring to FIGS. 1 to 4, the mobile terminal 100 is a bar type mobile terminal in which a first body 102 and a second body 104 are connected to each other, and includes a hinge module 106 for rotatably connecting the first body 102 and the second body 104. The first body 102 includes a first display unit 120 and a first speaker 181 on a first front surface, and a second display unit 130 and a second speaker 191 on a first rear surface of the first body 102. The second body 104 includes a first input unit 140 and a first microphone 183 on a second front surface, and a second input unit 150 and a second microphone 193 on a second rear surface of the second body 104. The hinge module 106 perpendicularly penetrates a surface of the first body 102 that faces the second body 104 and a surface of the second body 104 that faces the first body 102 to connect the first and second bodies 102 and 104 to rotate about a hinge axis A (FIG. 3).

In the display units 120 and 130 of the first body 102, a Liquid Crystal Display (LCD) is generally used, however display devices such as an Active Matrix Organic Light Emitting Diode (AM OLED) may be used. The first body 102 has a relatively larger screen and better resolution than the second display unit 130. For example, the first display unit 120 can be formed in a large Quarter Video Graphic Array (QVGA) LCD, and the second display unit 130 can be formed in a small Quarter Common Intermediate Format (QCIF) LCD. However, the present invention is not limited thereto, and the display units 120 and 130 can have the same size and resolution.

The first display unit 120 can provide a multimedia mode for displaying an execution screen of a multimedia function, and the second display unit 130 can provide a communication mode for displaying an execution screen of a general function such as a communication function. When a screen is activated, the first display unit 120 can be provided in a horizontal mode as in FIG. 1, and the second display unit 130 can be provided in a vertical mode as in FIG. 2. However, the display units 120 and 130 of the present invention are not limited thereto.

Screens of the display units 120 and 130 are not to be turned on at the same time. In other words, when one display unit is turned on, the other display unit is turned off.

The speakers 181 and 191 are provided adjacent to the far end of the first body 102 that is away from the second body 104.

For example, the first input unit 140 is a touchpad, and the second input unit 150 is a keypad. The touchpad of the first input unit 140 includes, for example, a direction button, a menu button, a cancellation button, a confirmation button, and a user specific button. The keypad of the second input unit 150 includes, for example, 3×4 character and numeric keys, direction search keys, and various function keys.

The mobile terminal 100 may include a third input unit (not shown) having several input buttons on a side surface. The mobile terminal 100 includes a fourth input unit 152 having direction search keys and various function.

The microphones 183 and 193 are provided adjacent to the far end of the second body 104 that is away from the first body 102.

The hinge module 106 is provided on the adjacent facing surfaces of the first body 102 and the second body 104. A driving power source of the hinge module 106 can rotate the first body 102 or the second body 104 in a manual mode, semiautomatic mode, or automatic mode. The hinge module 106 enables the second body 104 to sustain a rotation state by a preset angle to the first body 102. For example, the preset angle may be 0°, 30° to 45°, or 180°. Here, "0°" indicates a normal state, and the remaining angles indicate a rotation state. FIGS. 1 and 2 show the normal state, and FIGS. 3 and 4 show a rotation state.

The mobile terminal 100 may further include a retention module 108 at a portion of the adjacent facing surfaces of the first body 102 and the second body 104 opposite to the location of the hinge module 106 so that the bodies 102 and 104 may stably retain the normal state.

Figure 4:
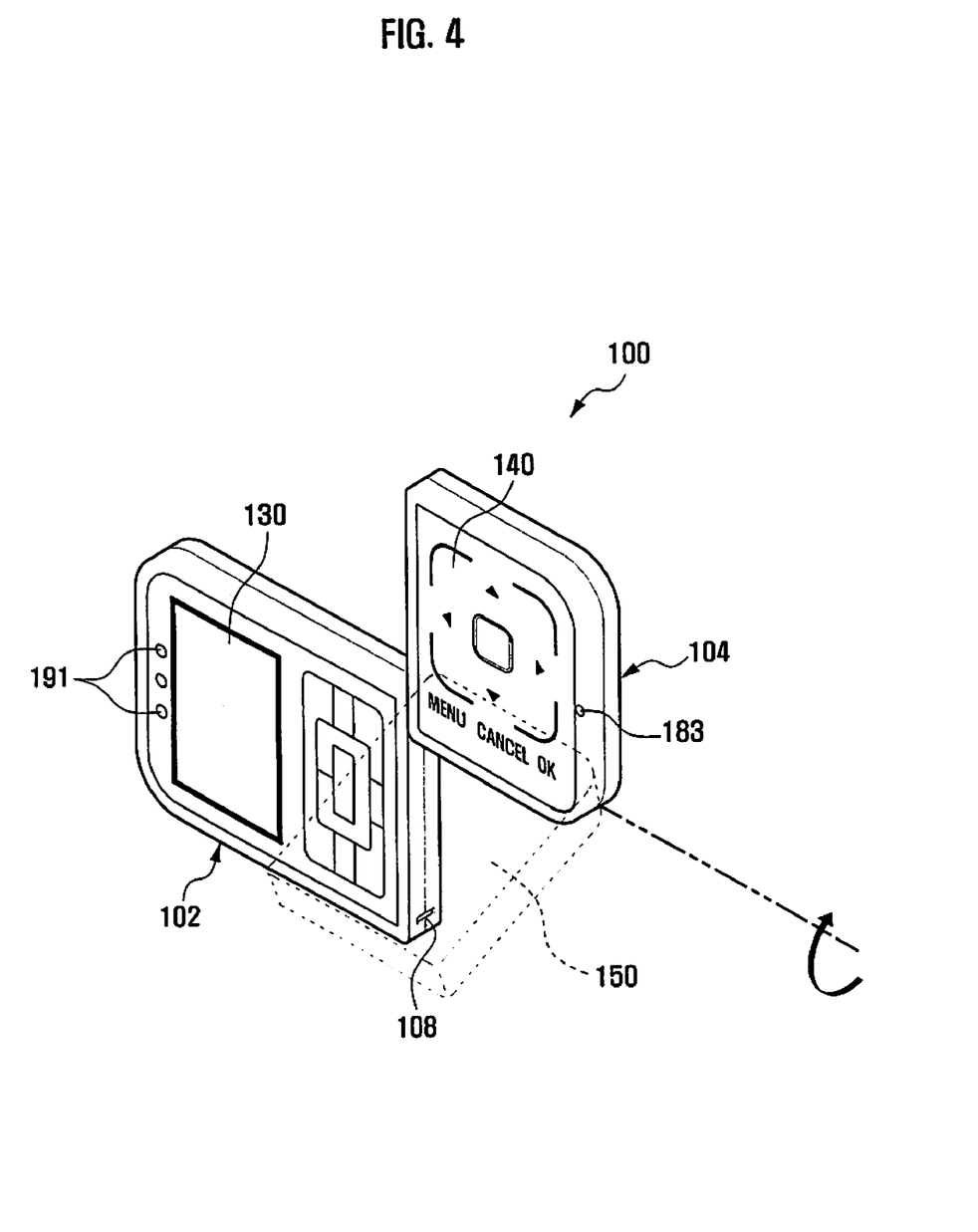
FIG. 4 is a perspective view illustrating an other side of the mobile terminal shown in FIG. 3.

In the mobile terminal 100, the normal state shown in FIGS. 1 and 2 can be converted to the rotation state shown in FIGS. 3 and 4, and the rotation state can be converted to the normal state. In the normal state shown in FIG. 1, when the first display unit 120 is activated, the first speaker 181 and the first microphone 183 are activated, and the second speaker 191 and the second microphone 193 are inactivated. In the rotation state shown in FIG. 3, as the second body 104 rotates, when the second input unit 150 is positioned on the same plane and facing the same direction as the first display unit 120 and the first display unit 120 is activated, a state of the second microphone 193 is converted to an activation state and a state of the first microphone 183 is converted to an inactivation state, and the first speaker 181 sustains an activation state and the second speaker 191 sustains an inactivation state.

In the normal state shown in FIG. 2, when the second display unit 130 is activated, the second speaker 191 and the second microphone 193 are activated, and the first speaker 181 and the first microphone 183 are inactivated. In the rotation state shown in FIG. 4, as the second body 104 rotates, when the first input unit 140 is positioned on the same plane and facing the same direction as the second display unit 130 and the second display unit 130 is activated, a state of the first microphone 183 is converted to an activation state and a state of the second microphone 193 is converted to an inactivation state, and the first speaker 181 sustains an inactivation state and the second speaker 191 sustains an activation state.

An activation state of either one of the display units 120 and 130 is a state in which an image is displayed on a screen, i.e. a state in which a screen is turned on. An inactivation state of the display units 120 and 130 is a state in which an image is not displayed on a screen, i.e. a state in which a screen is turned off. An activation state of the speakers 181 and 191 is a state in which a sound is output or can be output related to a screen by either one of the speakers. An inactivation state of the speakers 181 and 191 is a state in which the speakers 181 and 191 are turned off. An activation state of the microphones 183 and 193 is a state in which a sound is received or can be received by either one of the microphones. An inactivation state of the microphones 183 and 193 is a state in which the microphones 183 and 193 are turned off.

Figure 5:
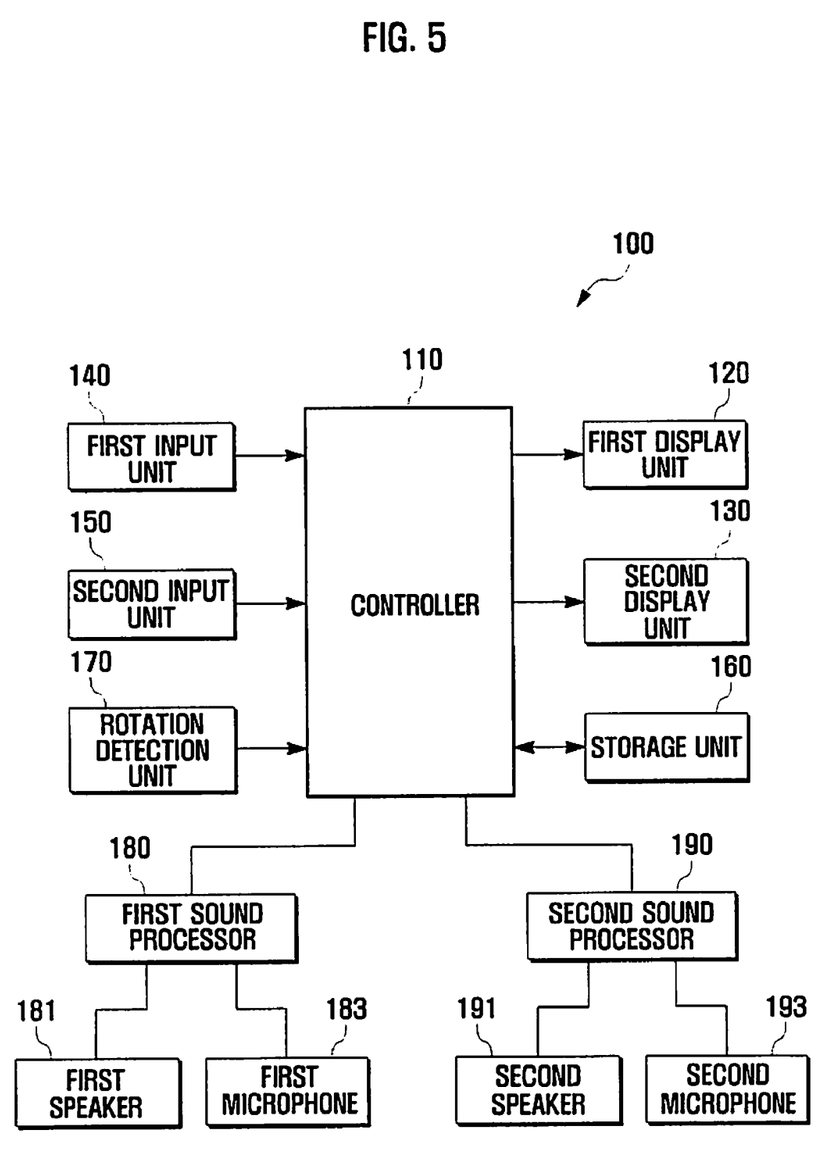
FIG. 5 is a block diagram illustrating a configuration of a mobile terminal having a dual display unit according to an exemplary embodiment of the present invention.

FIG. 5 is illustrates a configuration of a mobile terminal 100 having a dual display unit, which includes a controller 110, display units 120 and 130, input units 140 and 150, a storage unit 160, a rotation detection unit 170, a first sound processor 180 having a first speaker 181 and a first microphone 183, and a second sound processor 190 having a second speaker 191 and a second microphone 193. The mobile terminal 100 may further include a Radio Frequency (RF) unit for performing a communication function, a mobile broadcasting receiving unit for performing a multimedia function, and a camera unit, however as these units are not necessary for understanding the present invention, individual descriptions thereof are omitted.

The controller 110 performs general control operations of the mobile terminal 100, and includes one or two microprocessor chips. When the controller 110 includes two chips, one of them is a dedicated multimedia control chip. Particularly, the controller 110 performs a function of controlling a dual speaker and a dual microphone.

The display units 120 and 130 visually display various image information related to a state and function of the mobile terminal 100. Only one of the displays 120 and 130 may be activated at a time to display image information.

The input units 140 and 150 detect a user's input manipulation, generate an input signal according to the input manipulation, and send the generated signal to the controller 110.

The storage unit 160 stores a program required for controlling operation of the mobile terminal 100 and for data generated while performing the program. The storage unit 160 stores a program for controlling the speakers 181 and 191 and the microphones 183 and 193, and data generated while executing the program.

The rotation detection unit 170 detects whether the first body 102 and the second body 104 are rotated and sends a detection result to the controller 110. That is, the rotation detection unit 170 detects the normal state and the rotation state of the first body 102 and the second body 104.

The sound processors 180 and 190 convert a voice that is input to the microphones 183 and 193 to a digital signal, by the control of the controller 110, and decode voice data and output the decoded voice data through the speakers 181 and 191. The first sound processor 180 addresses the first speaker 181 and the first microphone 183, and the second sound processor 190 addresses the second speaker 191 and the second microphone 193.

The speakers 181 and 191 and the microphones 183 and 193 are selectively activated by the control of the controller 110. That is, the speakers 181 and 191 are selectively activated according to the activation state of the display units 120 and 130. The microphones 183 and 193 are selectively activated according to the rotation of the bodies 102 and 104, and to the activation state of the display units 120 and 130.

In more detail, the controller 110 determines which of the first display unit 120 and the second display unit 130 is activated. If the first display unit 120 is activated, the controller 110 activates the first speaker 181 and inactivates the second speaker 191. If the second display unit 130 is activated, the controller 110 inactivates the first speaker 181 and activates the second speaker 191.

If the first display unit 120 is activated and the bodies 102 and 104 are in a normal state, the controller 110 activates the first microphone 183 and inactivates the second microphone 193. If the first display unit 120 is activated and the bodies 102 and 104 are in a rotation state, the controller 110 inactivates the first microphone 183 and activates the second microphone 193.

If the second display unit 130 is activated and the bodies 102 and 104 are in the normal state, the controller 110 inactivates the first microphone 183 and activates the second microphone 193. If the second display unit 130 is activated and the bodies 102 and 104 are in the rotation state, the controller 110 activates the first microphone 183 and inactivates the second microphone 193.

When the first display unit 120 is activated and the second body 104 rotates to a position between 90° and 180° from the normal state relative to the first body 102, it is preferable to inactivate the first microphone 183 and to activate the second microphone 193. When the first display unit 120 is activated and the second body 104 rotates to a position between 0° and 90° from the normal state relative to the first body 102, it is preferable to activate the first microphone 183 and to inactivate the second microphone 193. This is because when the second body 104 rotates by less than 90° relative to the first body 102, the first speaker 181 and the first microphone 183 both face towards the front side of the mobile terminal 100, whereby when voice communication is performed, a voice may be well input to the first microphone 183, compared with the second microphone 193. Similar preference for activating the dual microphone applies when the second display unit 130 is activated and the mobile terminal 100 is in a rotation state.

Figure 6:
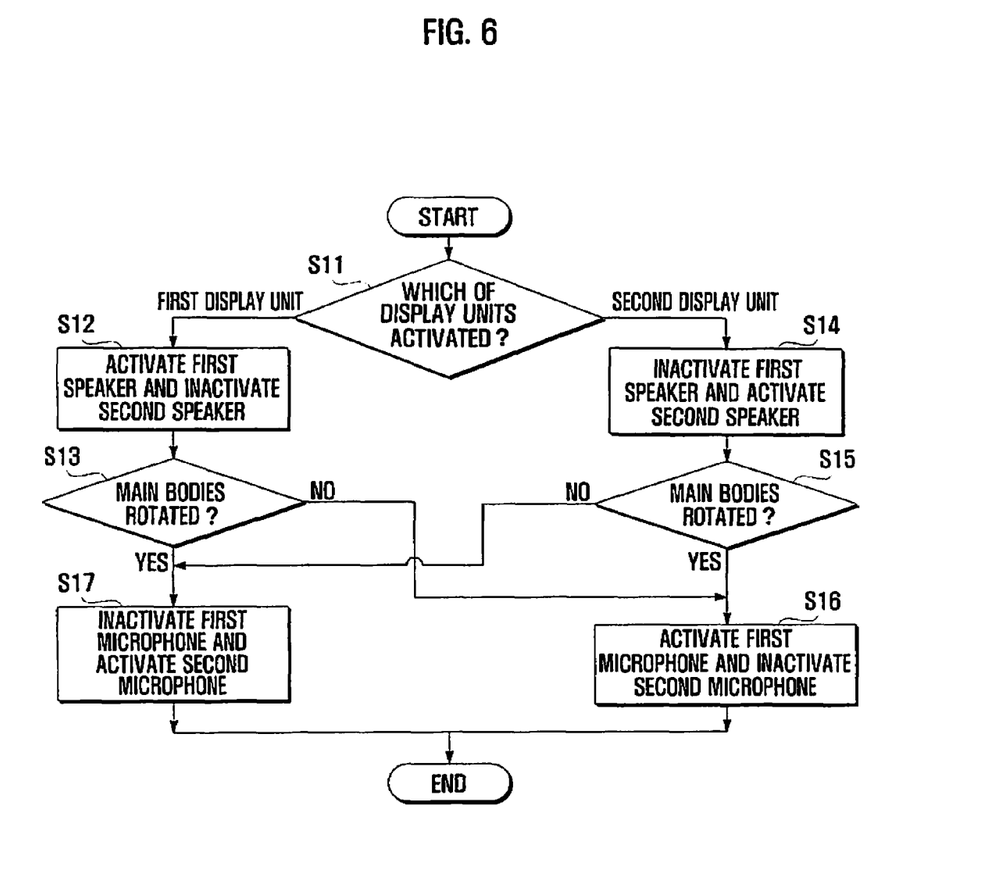
FIG. 6 is a flowchart illustrating a method of controlling a dual speaker and a dual microphone according to activation of a dual display unit of a mobile terminal according to an exemplary embodiment of the present invention.

FIG. 6 is a flowchart illustrating a method of controlling a dual speaker and a dual microphone in an activation state of a dual display unit of a mobile terminal according to an exemplary embodiment of the present invention.

Referring now to FIGS. 1 to 6, the controller 110 determines which one of the dual display units 120 and 130 is activated in step S11. Conversion of a state of the display units 120 and 130 to an activation state is performed by the controller 110 when a user inputs a key or when a signal is input from the outside of the mobile terminal 100. Conversion of a state of the display units 120 and 130 to an activation state includes conversion of the activation state between the first display unit 120 and the second display unit 130.

If the first display unit 120 is activated, the controller 110 activates the first speaker 181 and inactivates the second speaker 191 in step S12. The controller 110 outputs a sound related to an image displayed on a screen of the first display unit 120 through the first speaker 181 provided on the same surface of the first body 102 as the first display unit 120.

Next, the controller 110 determines whether the bodies 102 and 104 are rotated in step S13. If the bodies 102 and 104 are not rotated, the controller 110 determines that the display units 120 and 130 are in the normal state, as shown in FIG. 1, and the controller 110 activates the first microphone 183 and inactivates the second microphone 193 in step S16. If the bodies 102 and 104 are rotated, the controller 110 determines that the display units 120 and 130 are in the rotation state, as shown in FIG. 3, and the controller 110 inactivates the first microphone 183 and activates the second microphone 193 in step S17.

If the second display unit 130 is activated at step S11, the controller 110 inactivates the first speaker 181 and activates the second speaker 191 in step S14. The controller 110 outputs a sound related to an image displayed on a screen of the second display unit 130 through the second speaker 191.

Next, the controller 110 determines whether the bodies 102 and 104 are rotated in step S15. If the bodies 102 and 104 are not rotated, the controller 110 determines that the display units 120 and 130 are in the normal state, as shown in FIG. 2, and the controller 110 inactivates the first microphone 183 and activates the second microphone 193 in step S17. If the bodies 102 and 104 are rotated, the controller 110 determines that the display units 120 and 130 are in the rotation state, as shown in FIG. 4, and the controller 110 activates the first microphone 183 and inactivates the second microphone 193 in step S16.

As described above, according to the present invention, a speaker and a microphone are provided on each of two opposite surfaces of a mobile terminal, and the speaker that is provided on the same surface as an activated display unit is activated to output a sound, whereby sound quality can be improved.

When the mobile terminal is in a rotation state, the microphone provided on a surface facing about the same direction of the surface in which the activated display unit is provided is activated, thereby enabling a user to perform voice communication through the mobile terminal without conversion of the mobile terminal to a normal state. For example, when the user of the mobile terminal performs voice communication while viewing multimedia data through a first display unit in a rotation state, a controller activates a first speaker and a second microphone, whereby the user of the mobile terminal can perform voice communication in a rotation state without conversion of the mobile terminal to a normal state.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for controlling a mobile terminal, the mobile terminal including a first body having a first front surface for receiving a first display unit and a first speaker, and a first rear surface opposite the first front surface and for receiving a second display unit and a second speaker; a second body having a second front surface for receiving a first microphone, and a second rear surface opposite the second front surface and for receiving a second microphone; and a hinge module for rotatably connecting the first body and the second body, the method comprising:
   determining which one of the first and second display units is activated;
   activating the first speaker when the first display unit is activated;
   activating the second speaker when the second display unit is activated;
   determining, when the first display unit is activated, whether the first and second bodies are in a normal state or in a rotation state;
   activating the first microphone and inactivating the second microphone when the first and second bodies are in the normal state; and
   inactivating the first microphone and activating the second microphone when the first and second bodies are in the rotation state.

2. The method of claim 1, wherein the normal state is a state in which the first front surface and the second front surface align, and the rotation state is a state in which the first front surface and the second front surface do not align.

3. The method of claim 2, wherein the rotation state comprises a state in which the second body rotates from the normal state to a position between 90° and 180° relative to the first body.

4. The method of claim 1, further comprising:
   determining, when the second display unit is activated, whether the first and second bodies are in a normal state or in a rotation state;
   activating the second microphone and inactivating the first microphone when the first and second bodies are in the normal state; and
   inactivating the second microphone and activating the first microphone when the first and second bodies are in the rotation state.

5. The method of claim 4, wherein the normal state is a state in which the first front surface and the second front surface align, and the rotation state is a state in which the first front surface and the second front surface do not align.

6. The method of claim 5, wherein the rotation state comprises a state in which the second body rotates from the normal state to a position between 90° and 180° relative to the first body.

7. A method for controlling a mobile terminal, the mobile terminal including a first body having a first display unit and first speaker on a first front surface, and a second display unit and second speaker on a first rear surface opposite the first front surface; a second body having a first microphone on a second front surface, and a second microphone on a second rear surface opposite the second front surface; and a hinge module perpendicularly penetrating both a surface of the first body that faces the second body and a surface of the second body that faces the first body to rotatably connect the first body and the second body, the method comprising:
   determining which one of the first and second display units is activated;
   activating the first speaker and inactivating the second speaker when the first display unit is activated;
   activating the second speaker and inactivating the first speaker when the second display unit is activated;
   determining, when the first display unit is activated, whether the first and second bodies are in a normal state or in a rotation state;
   activating, when the first and second bodies are in the normal state, the first microphone and inactivating the second microphone; and
   activating, when the first and second bodies are in the rotation state, the second microphone and inactivating the first microphone.

8. The method of claim 7, wherein the normal state is a state in which the first front surface and the second front surface align, and the rotation state is a state in which the first front surface and the second front surface do not align.

9. The method of claim 8, wherein the rotation state comprises a state in which the second body rotates from the normal state to a position between 90° and 180° relative to the first body.

10. The method of claim 7, further comprising:
  determining, when the second display unit is activated, whether the first and second bodies are in a normal state or in a rotation state;
  activating, when the first and second bodies are in the normal state, the second microphone and inactivating the first microphone; and
  activating, when the first and second bodies are in the rotation state, the first microphone and inactivating the second microphone.

11. The method of claim 10, wherein the normal state is a state in which the first front surface and the second front surface align, and the rotation state is a state in which the first front surface and the second front surface do not align.

12. The method of claim 11, wherein the rotation state comprises a state in which the second body rotates from the normal state to a position between 90° and 180° relative to the first body.

13. A mobile terminal comprising:
  a first body having a first front surface receiving a first display unit and a first speaker, and a first rear surface opposite the first front surface, the first rear surface receiving a second display unit and a second speaker;
  a second body having a second front surface receiving a first microphone, and a second rear surface opposite the second front surface, the second rear surface receiving a second microphone;
  a hinge module perpendicularly penetrating both a surface of the first body that faces the second body and a surface of the second body that faces the first body to rotatably connect the first body and the second body about a peripheral axis; and
  a controller for determining which one of the first and second display units is activated, for activating the first speaker when the first display unit is activated, for activating the second speaker when the second display unit is activated, for determining whether the first and second bodies are in a normal state or in a rotation state when the first display unit is activated, for activating the first microphone and inactivating the second microphone when the first and second bodies are in the normal state, and for activating the second microphone and inactivating the first microphone when the first and second bodies are in a rotation state.

14. The mobile terminal of claim 13, further comprising a rotation detection unit for determining whether the first and second bodies are in the normal state or in the rotation state.

15. The mobile terminal of claim 14, wherein the normal state is a state in which the first front surface and the second front surface align, and the rotation state is a state in which the first front surface and the second front surface do not align.

16. The mobile terminal of claim 15, wherein the rotation state comprises a state in which the second body rotates from the normal state to a position between 90° and 180° relative to the first body.

17. The mobile terminal of claim 16, wherein the controller inactivates the first microphone and activates the second microphone when the second display unit is activated and the first and second bodies are in the normal state.

18. The mobile terminal of claim 16, wherein the controller activates the first microphone and inactivates the second microphone when the second display unit is activated and the first and second bodies are in the rotation state.

* * * * *